Patented Mar. 23, 1926.

1,577,450

UNITED STATES PATENT OFFICE.

CHARLES H. CROWELL, OF BROOKLYN, NEW YORK.

COATED FIBROUS ARTICLE AND COATING COMPOSITION THEREFOR.

No Drawing.   Application filed June 11, 1923.   Serial No. 644,804.

*To all whom it may concern:*

Be it known that I, CHARLES H. CROWELL, a citizen of the United States, and resident of the borough of Brooklyn, county of Kings, city and State of New York, have made a certain new and useful Invention Relating to Coated Fibrous Articles and Coating Compositions Therefor, of which the following is a specification.

This invention relates especially to coated cloth and paper and to silicate coating compositions therefor in which considerable proportions of highly hygroscopic bentonite clay or the like is combined or incorporated so as to minimize or prevent cracking or flaking at least when relatively thin films or coatings are used. This bentonite clay when in finely divided condition is extremely absorbent of water and absorbs as much as eight to twelve parts of water by weight to form a plastic composition which does not completely dry out readily at ordinary temperatures; and when combined with the ordinary alkaline silicate of sodium mixtures such as are used for package sealing purposes, this clay seems to exert a decidedly softening and toughening action tending to prevent the cracking and flaking which occurs with dried films of such silicate when they are bent or folded. In making such coating compositions the finely divided clay is preferably incorporated with water either to form a thin water suspension or to form a plastic mass of somewhat thin or creamy consistency and then this clay may be incorporated or combined with the alkaline silicate mixtures such as are used for package sealing, etc., and having a specific gravity of about 40 to 50 degrees Baumé and containing 8 to 12 per cent of an alkaline silicate more or less. Thinly fluid silicate compositions may be applied to cloth or paper in any suitable way as by running the fabric through the mixtures or applying the compositions to the fabric by applying rolls or the like and then drying the coated material so that thin flexible coatings of this character may be formed in which only about 3 to 6 gallons of the coating compositions need be used per thousand square yards in some cases.

This bentonite clay having distinctive colloidal properties and having such water absorbing properties as above described may have about the following composition indicated by its chemical and physical analysis:

*Chemical analysis.*

|  | Per cent. |
|---|---|
| Silica, ($SiO_2$) | 57.98 |
| Ferrous oxide, (FeO) | 0.12 |
| Ferric oxide, ($Fe_2O_3$) | 3.80 |
| Alumina, ($Al_2O_3$) | 22.46 |
| Lime, (CaO) | 1.92 |
| Magnesia, (MgO) | 3.24 |
| Soda and potash ($Na_2O$ and $K_2O$) | 1.35 |
| Sulphur trioxide, ($SO_3$) | 0.75 |
| Loss on ignition ($H_2O, CO_2$, organic material) | 7.93 |

Sample contained 3.14% calcium carbonate ($CaCO_3$) and 1.34% sodium sulphate ($Na_2SO_4$). All the remaining bases are combined as silicates. Analysis of sample dried at 110° C.

*Physical analysis.*

| Division. | Name. | Diameter in millimeters. | Per cent. |
|---|---|---|---|
| 1 | Medium sand | 1.0–0.5 | None. |
| 2 | Sand | 0.5–0.15 | 0.04 |
| 3 | Fine sand | 0.15–0.075 | 0.41 |
| 4 | Very fine sand | .075–.033 | 2.02 |
| 5 | Silt | .033–.008 | 3.86 |
| 6 | Fine silt | .008–.003 | 2.23 |
| 7 | Very fine silt | .003–.0015 | 17.62 |
| 8 | Clay, finer than | .0015 | 73.82 |

This hygroscopic clay may be used with advantage to promote the flexibility and toughness of silicate coating and 3 to 5 per cent more or less of this clay may be incorporated in the aqueous silicate of sodium composition with advantage for this purpose. It is of course understood that the components are preferably thoroughly incorporated and the composition is preferably stirred or agitated during the coating process to prevent any settling tendency; also where such coating compositions have been previously made up or shipped they should be stirred, agitated or ground together sufficiently to ensure uniformity before they are applied for coating purposes.

One illustrative relatively thin composition may be formed by first combining one-half to three-quarters of a pound of finely divided bentonite clay in a gallon of water so as to form a thin and substantially uniform water suspension and then stirring in a gallon of silicate of sodium of about 45 to 47 degrees Baumé and containing about 11 per cent of an alkaline silicate which makes a thinly aqueous coating composition which may be applied in various ways to kraft or other paper or to filled or sized cloth or other fabric. Kraft paper, for instance, may have this composition applied to one or both sides before drying and light coats of this silicate coating composition may be applied to the extent of only 3 or 4 gallons per thousand square yards, if desired. The composition sufficiently penetrates the superficial fibers of the paper so as to become thoroughly incorporated therewith and on drying forms a substantially water-proof or water-resistant coating which is also substantially grease-proof and which is sufficiently tough and flexible so that it does not crack or separate to an excessive or objectionable extent with ordinary bending of the paper.

Relatively flexible silicate coatings of this general character may advantageously be applied to various materials such as corrugated paper board, cardboard, paper cans and containers, which may be given internal and external coatings to render them less permeable to various substances and of course in many cases much thicker coatings may be applied where the additional strength and resistance is preferable to the increased flexibility and toughness which are naturally possessed by the relatively thinner coatings. In some cases flexible or relatively thick silicate coatings may with advantage be applied to sand paper, emery paper, or emery cloth or other abrasive faced fabric or material and this makes it possible to considerably reduce the softening action due to moist atmospheric conditions with the usual gum or glue coatings used in sand paper and the like.

This invention has been described in connection with a number of illustrative compositions, proportions, materials, methods of preparation and use, to the details of which disclosure the invention is not of course to be limited since what is claimed as new and what is desired to be secured by Letters Patent is set forth in the appended claims.

1. The coated kraft paper having on both sides thereof a substantially grease-proof water-repellent thin flexible coating of silicate of sodium with which finely divided bentonite clay has been mixed to the extent of at least about half a pound per gallon of silicate solution.

2. The coated paper having a substantially grease-proof water-repellent thin flexible coating of silicate of sodium with which finely divided bentonite clay has been mixed to the extent of at last about half a pound per gallon of silicate solution.

3. The coated paper having a water-repellent thin flexible coating of silicate of sodium with which finely divided bentonite clay has been mixed to minimize the chipping or cracking.

4. The coated fibrous article having a water-repellent coating of silicate of sodium with which finely divided bentonite clay has been mixed to minimize chipping or cracking.

5. The coated fibrous article having a substantially grease-proof water-repellent coating of silicate of sodium with which finely divided bentonite clay has been mixed to minimize clipping or cracking.

6. The coated fibrous article having a coating of silicate of sodium with which finely divided bentonite clay has been mixed.

7. The coated paper having a thin flexible coating of silicate of sodium with which finely divided bentonite clay has been mixed.

8. The coated paper having a flexible coating of silicate of sodium with which bentonite clay has been mixed.

9. The silicate of soda coating composition comprising approximately a gallon of a water solution of silicate of sodium of about 47° Baumé and containing about 10 to 12 per cent of the alkaline silicate, with which is intimately incorporated about one-half to three-quarters of a pound of finely divided bentonite clay suspended in a gallon of water, to minimize chipping or cracking of the applied silicate coating.

10. The silicate of sodium coating composition comprising approximately a gallon of a water solution of silicate of sodium of between about 45° to 50° Baumé and containing about ten per cent of the alkaline silicate, with which is intimately incorporated about one-half to three-quarters of a pound of finely divided bentonite clay suspended in water, to minimize chipping or cracking of the applied silicate coating.

11. The silicate of sodium coating composition comprising approximately a gallon of alkaline silicate of sodium of about 47° Baumé with which is intimately incorporated at least about one-half to three-quarters of a pound of finely divided bentonite clay suspended in water, to minimize chipping or cracking of the applied silicate coating.

12. The coated fibrous article having a water-repellent silicate coating with which finely divided bentonite clay has been mixed to minimize chipping or cracking.

13. The silicate of sodium coating composition comprising approximately a gallon of an alkaline water solution silicate of sodium of between about 45° and 50° Baumé with which is intimately incorporated at least one-half a pound of water absorbent finely divided bentonite clay to minimizing chipping or cracking of the applied silicate coating.

14. The silicate coating composition comprising approximately a gallon of an alkaline silicate of about 47 degrees Baumé with which is intimately incorporated, at least about one-half to three-quarters of a pound of finely divided bentonite clay to minimize chipping or cracking of the applied silicate coating.

CHARLES H. CROWELL.